US012205002B2

(12) United States Patent
Taslakian et al.

(10) Patent No.: US 12,205,002 B2
(45) Date of Patent: Jan. 21, 2025

(54) METHOD AND SYSTEM FOR TRAINING MODEL TO PERFORM LINK PREDICTION IN KNOWLEDGE HYPERGRAPH

(71) Applicant: SERVICENOW CANADA INC., Montréal (CA)

(72) Inventors: Perouz Taslakian, Montréal (CA); David Vazquez Bermudez, Montréal (CA); David Poole, Montréal (CA); Bahare Fatemi, Montréal (CA)

(73) Assignee: ServiceNow Canada Inc., Montreal (CA)

( * ) Notice: Subject to any disclaimer, the term of this patent is extended or adjusted under 35 U.S.C. 154(b) by 823 days.

(21) Appl. No.: 17/304,577

(22) Filed: Jun. 23, 2021

(65) Prior Publication Data

US 2022/0414520 A1    Dec. 29, 2022

(51) Int. Cl.
*G06N 20/00* (2019.01)
*G06N 5/02* (2023.01)

(52) U.S. Cl.
CPC .............. *G06N 20/00* (2019.01); *G06N 5/02* (2013.01)

(58) Field of Classification Search
CPC ..................................................... G06N 20/00
USPC .......................................................... 706/12
See application file for complete search history.

(56) References Cited

U.S. PATENT DOCUMENTS 10,157,226 B1* 12/2018 Costabello ............. G06N 5/022
12,014,288 B1*  6/2024 Abeloos .................. G06N 5/04
2019/0220524 A1*  7/2019 Costabello ........ G06F 16/24578
2020/0342954 A1* 10/2020 Ui .......................... G16B 40/00
2022/0067030 A1*  3/2022 Jiao ....................... G06N 3/084
2022/0300831 A1*  9/2022 Friede .................... G06N 5/022
2022/0414520 A1* 12/2022 Taslakian ............... G06N 5/041
2023/0169361 A1*  6/2023 Mitra ..................... G06N 3/006
                                                            706/12
2023/0401461 A1* 12/2023 Gueret ................... G06N 5/025
2024/0127909 A1*  4/2024 Pai ........................ G16C 20/50
2024/0135205 A1*  4/2024 Dash ..................... G06N 5/025

(Continued)

OTHER PUBLICATIONS

Z. Chen, X. Wang, C. Wang and J. Li, "Explainable link prediction in knowledge hypergraphs", Proc. 31st ACM Int. Conf. Inf. Knowl. Manage., pp. 262-271, 2022. (Year: 2022).*

(Continued)

*Primary Examiner* — Reza Nabi
(74) *Attorney, Agent, or Firm* — FASKEN MARTINEAU DUMOULIN LLP; Johann Gest; Dennis Haszko

(57) ABSTRACT

There is provided a method and system for training an embedding model to perform relation predictions in a knowledge hypergraph to output a trained embedding model. A training dataset comprising tuples representing relations between entities in the knowledge hypergraph are received. The embedding model is trained to perform relation predictions for each given tuple from a subset of tuples in the training dataset by generating a respective entity vector for each entity and a respective relation matrix representing relations between the entities. The entity vectors and relation matrix are split into a plurality of windows, and interaction values between elements in each window are calculated. A relation score indicative of the relation in the given tuple being true is calculated. Parameters of the embedding model are updated based on the relation scores for the subset of tuples. The trained embedding model is then output.

22 Claims, 8 Drawing Sheets

(56) References Cited

U.S. PATENT DOCUMENTS

| | | |
|---|---|---|
| 2024/0135676 A1* | 4/2024 | Peddireddy ............ G06V 10/56 |
| 2024/0160957 A1* | 5/2024 | Gueret ................... G06N 20/00 |
| 2024/0202212 A1* | 6/2024 | Vidal ................. G06F 16/2455 |
| 2024/0232620 A1* | 7/2024 | Singh ....................... G06N 3/08 |
| 2024/0256917 A1* | 8/2024 | Bayram ................. G06N 3/084 |
| 2024/0275798 A1* | 8/2024 | Soler Garrido ... G06F 16/24578 |

OTHER PUBLICATIONS

Wen et al., "On the Representation and Embedding of Knowledge Bases Beyond Binary Relations". arXiv—Computer Science—Machine Learning, Apr. 28, 2016 (Apr. 28, 2016), pp. 1-8, [online] [retrieved on Sep. 7, 2022 (Jul. 9, 2022)]. Retrieved from the Internet: <https://arxiv.org/pdf/1604.08642.pdf>.

Wang et al., "Link Prediction on N-ary Relational Facts: A Graph-based Approach". arXiv—Computer Science—Artificial Intelligence, May 18, 2021 (May 18, 2021), pp. 1-12, [online] [retrieved on Sep. 7, 2022 (Jul. 9, 2022)]. Retrieved from the Internet: < https://arxiv.org/pdf/2105.08476.pdf>.

* cited by examiner

METHOD AND SYSTEM FOR TRAINING MODEL TO PERFORM LINK PREDICTION IN KNOWLEDGE HYPERGRAPH

CROSS-REFERENCE TO RELATED APPLICATIONS

None.

FIELD

The present technology relates to machine learning (ML) and hypergraphs in general and more specifically to methods and systems for training an embedding model to perform link prediction in knowledge hypergraphs.

BACKGROUND

Knowledge hypergraphs are knowledge bases that store tuples about the world in the form of relations among two or more entities. They can be seen as one generalization of knowledge hypergraphs, in which relations are defined on two entities. Knowledge hypergraphs have applications in several tasks such as searching and automatic question answering. A large number of knowledge hypergraphs have been created and are publicly available, such as YAGO, DBPEDIA, NELL, and FREEBASE.

Reasoning on knowledge hypergraphs is an important problem as most world knowledge can be represented in the form of relations between identifiers representing entities. It is a problem that is less explored than that of reasoning in knowledge hypergraphs. Hypergraphs are the original structure of many existing graph datasets. Wen et al. in "On the representation and embedding of knowledge bases beyond binary relations." in IJCAI, 2016 observed that in the original FREEBASE more than a third of the entities participate in non-binary relations (i.e., defined on more than two entities). Fatemi et al. observed, in addition, that 61% of the relations in the original FREEBASE are non-binary. Similar to knowledge hypergraphs, knowledge hypergraphs are incomplete because accessing and storing all the true information in the world is difficult.

The goal of link prediction (or knowledge hypergraph completion) in knowledge hypergraphs is to predict unknown links or relationships between entities based on existing ones. While it is possible to convert a knowledge hypergraph into a knowledge graph and apply to it existing reasoning methods, Fatemi et al. in "Knowledge hypergraphs: Prediction beyond binary relations." In IJCAI, 2020 and Wen et al. showed that embedding-based methods for knowledge hypergraph completion do not work well out of the box for knowledge hypergraphs obtained through such conversion techniques.

Therefore, there is a need for an improved method and system for performing link prediction in a knowledge hypergraph.

SUMMARY

It is an object of the present technology to ameliorate at least some of the inconveniences present in the prior art. One or more embodiments of the present technology may provide and/or broaden the scope of approaches to and/or methods of achieving the aims and objects of the present technology.

Developers of the present technology have appreciated that most existing solutions for knowledge completion work well on knowledge graphs but fail to produce satisfying results when they are extended to knowledge hypergraphs. Given that knowledge hypergraphs (i) store more complete information about facts and (ii) easier to obtain from relational databases (the most common data storage system with clients), working directly with hypergraphs is desirable.

One or more embodiments of the present technology have been developed based on developers' appreciation that there is a need for an embedding model that could perform link prediction in knowledge graphs and could also represent relational algebra operations to improve its link prediction performance. By introducing interactions between elements in the embedding space when calculating a link prediction score, developer(s) have appreciated that the performance in link prediction could be improved by facilitating flow of information, while also enabling the model to represent relational algebra operations such as renaming, projection, set union, selection, and set difference. Such a trained embedding model may be used to reason about relationships between entities in a dataset and produce high-accuracy predictions for missing facts.

Thus, one or more embodiments of the present technology are directed to a method of and a system for training a model to perform link or relation predictions in a knowledge hypergraph.

In accordance with a broad aspect of the present technology, there is provided a method for training an embedding model to perform relation predictions in a knowledge hypergraph to output a trained embedding model, the method being executed by a processor. The method comprises: receiving a training dataset comprises a set of tuples from the knowledge hypergraph, each of the set of tuples comprises a respective relation between a respective set of entities in the knowledge hypergraph, initializing the embedding model, training the embedding model to perform relation predictions between entities in the training dataset to thereby obtain a trained embedding model, the training comprises: for each given tuple in a subset of tuples from the training dataset: generating, for each respective entity in the given tuple, a respective entity vector representation thereof in a multidimensional space, generating, for the respective relation in the given tuple, a relation matrix representing relations between the set of entities in the given tuple in the multidimensional space, splitting the respective entity vectors and the relation matrix into a plurality of windows, calculating, for each window of the plurality of windows, an interaction value indicative of an interaction between elements of the respective entity vectors and the relation matrix within the window, determining, based on the interaction values, a respective relation score for the given tuple, the relation score being indicative of a probability of the relation between the set of entities being true, and updating, based on the respective relation scores, at least a set of parameters of the embedding model to thereby obtain an updated set of parameters, and outputting the trained embedding model, the trained embedding model comprises the set updated set of parameters.

In one or more embodiments of the method, the method further comprises, prior to said updating based on the respective relation scores, the set of parameters of the embedding model to thereby obtain an updated set of parameters: determining, using a loss function, based on the relation scores and the subset of tuples, a loss, and said updating comprises backpropagating, based on the loss, values of the set of parameters to thereby obtain the updated set of parameters.

In one or more embodiments of the method, the loss function comprises a cross entropy loss.

In one or more embodiments of the method, said updating comprises using stochastic gradient descent.

In one or more embodiments of the method, each window comprises a predetermined number of elements.

In one or more embodiments of the method, a number the plurality of windows is a ratio of a number of dimensions in the multidimensional space and the predetermined number of elements.

In one or more embodiments of the method, said determining the respective relation score for the given tuple comprises using a monotonically increasing nonlinear function.

In one or more embodiments of the method, said determining the respective relation score comprises using a scoring function defined by:

$$\phi_\theta(r(x_1, \ldots, x_n)) = \frac{1}{n_w} \sum_{j=0}^{n_w-1} \sigma\left(b_r^j + \sum_{i=1}^{|r|} \sum_{k=0}^{w-1} x_i[jw+k] \times r[i][jw+k]\right)$$

where: $x_i$ is the entity vector of an entity $x_i$, r is a relation matrix of a tuple $r(x_1, \ldots, x_n)$, $\sigma$ is the monotonically increasing nonlinear function, i is an entity number, j is a window number from 0 to $n_w$, $$n = \left[\frac{d}{w}\right]$$

the number of windows, and $b_r^j$ the bias term for relation r for the $j^{th}$ window, for all j=1, 2, . . . , $n_w$. k is an element number within window j.

In one or more embodiments of the method, the trained embedding model is adapted to represent a set of relational algebra operations comprises at least one of: renaming, projection, set union, selection, and set difference.

In one or more embodiments of the method, each set of entities in a tuple comprises at least two entities.

In one or more embodiments of the method, the set of tuples comprises positive tuples representing facts in the knowledge hypergraph and negative tuples representing lies in the knowledge hypergraph.

In accordance with a broad aspect of the present technology, there is provided a system for training an embedding model to perform relation predictions in a knowledge hypergraph to output a trained embedding model. The system comprises: a processor, and a non-transitory storage medium operatively connected to the processor, the non-transitory storage medium comprising computer-readable instructions. The processor, upon executing the computer-readable instructions, is configured for: receiving a training dataset comprises a set of tuples from the knowledge hypergraph, each of the set of tuples comprises a respective relation between a respective set of entities in the knowledge hypergraph, initializing the embedding model, training the embedding model to perform relation predictions between entities in the training dataset to thereby obtain a trained embedding model, the training comprises: for each given tuple in a subset of tuples from the training dataset: generating, for each respective entity in the given tuple, a respective entity vector representation thereof in a multidimensional space, generating, for the respective relation in the given tuple, a relation matrix representing relations between the set of entities in the given tuple in the multidimensional space, splitting the respective entity vectors and the relation matrix into a plurality of windows, calculating, for each window of the plurality of windows, an interaction value indicative of an interaction between elements of the respective entity vectors and the relation matrix within the window, determining, based on the interaction values, a respective relation score for the given tuple, the relation score being indicative of a probability of the relation between the set of entities being true, and updating, based on the respective relation scores, at least a set of parameters of the embedding model to thereby obtain an updated set of parameters, and outputting the trained embedding model, the trained embedding model comprises the set updated set of parameters.

In one or more embodiments of the system, the processor is further configured for, prior to said updating based on the respective relation scores, the set of parameters of the embedding model to thereby obtain an updated set of parameters: determining, using a loss function, based on the relation scores and the subset of tuples, a loss, and said updating comprises backpropagating, based on the loss, values of the set of parameters to thereby obtain the updated set of parameters.

In one or more embodiments of the system, the loss function comprises a cross entropy loss.

In one or more embodiments of the system, said updating comprises using stochastic gradient descent.

In one or more embodiments of the system, each window comprises a predetermined number of elements.

In one or more embodiments of the system, a number the plurality of windows is a ratio of a number of dimensions in the multidimensional space and the predetermined number of elements.

In one or more embodiments of the system, said determining the respective relation score for the given tuple comprises using a monotonically increasing nonlinear function.

In one or more embodiments of the system, said determining the respective relation score comprises using a scoring function defined by:

$$\phi_\theta(r(x_1, \ldots, x_n)) = \frac{1}{n_w} \sum_{j=0}^{n_w-1} \sigma\left(b_r^j + \sum_{i=1}^{|r|} \sum_{k=0}^{w-1} x_i[jw+k] \times r[i][jw+k]\right)$$

where: $x_i$ is the entity vector of an entity $x_i$, r is a relation matrix of a tuple $r(x_1, \ldots, x_n)$, $\sigma$ is the monotonically increasing nonlinear function, i is an entity number, j is a window number from 0 to $n_w$, $$n = \left[\frac{d}{w}\right]$$

the number of windows, and $b_r^j$ the bias term for relation r for the $j^{th}$ window, for all j=1, 2, . . . , $n_w$. k is an element number within window j.

In one or more embodiments of the system, the trained embedding model is adapted to represent a set of relational algebra operations comprises at least one of: renaming, projection, set union, selection, and set difference.

In one or more embodiments of the system, each set of entities in a tuple comprises at least two entities.

In one or more embodiments of the system, the set of tuples comprises positive tuples representing facts in the knowledge hypergraph and negative tuples representing lies in the knowledge hypergraph.

Terms and Definitions

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
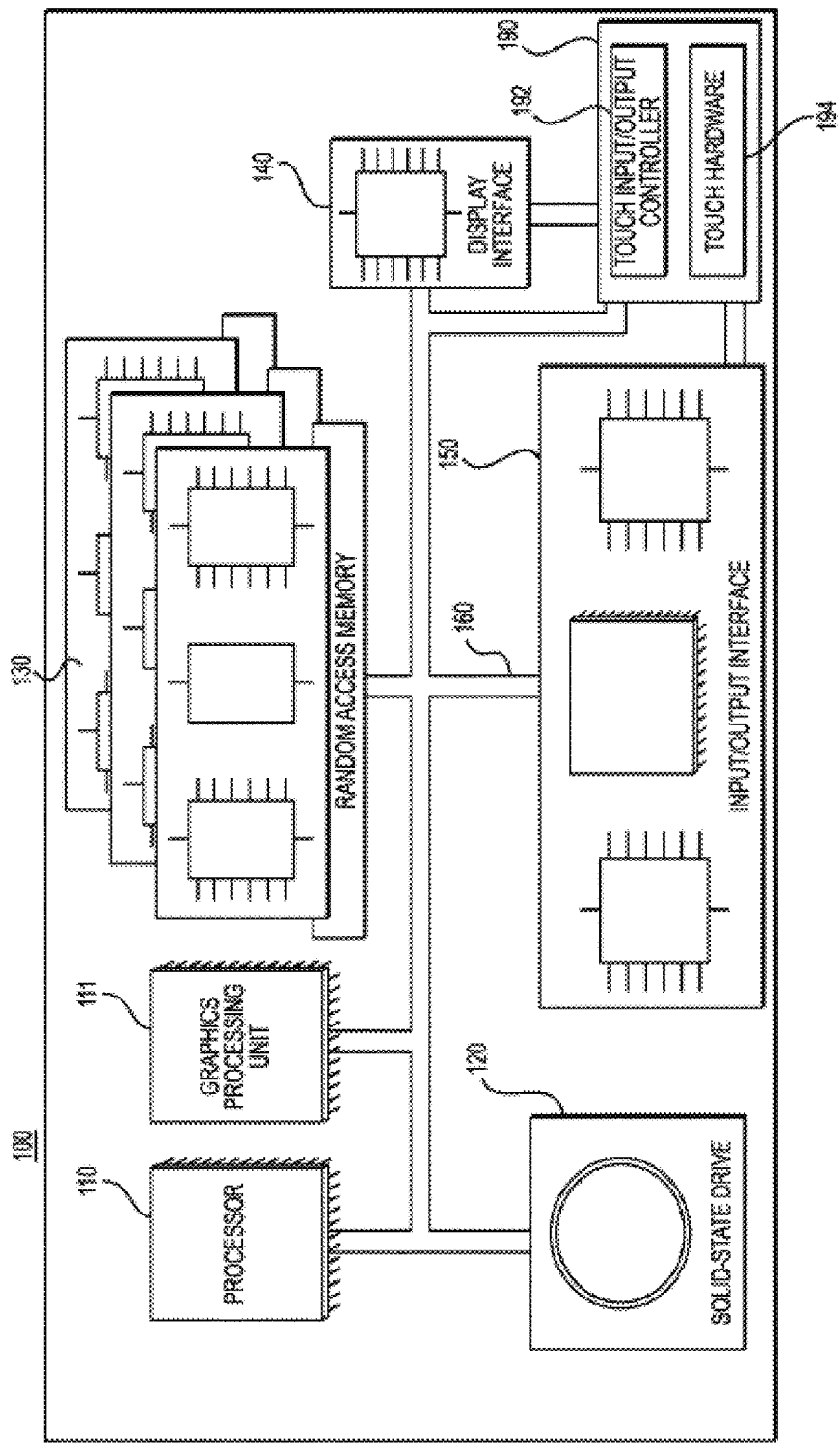
FIG. 1 illustrates a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for training an embedding model to perform link prediction in a knowledge hypergraph. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
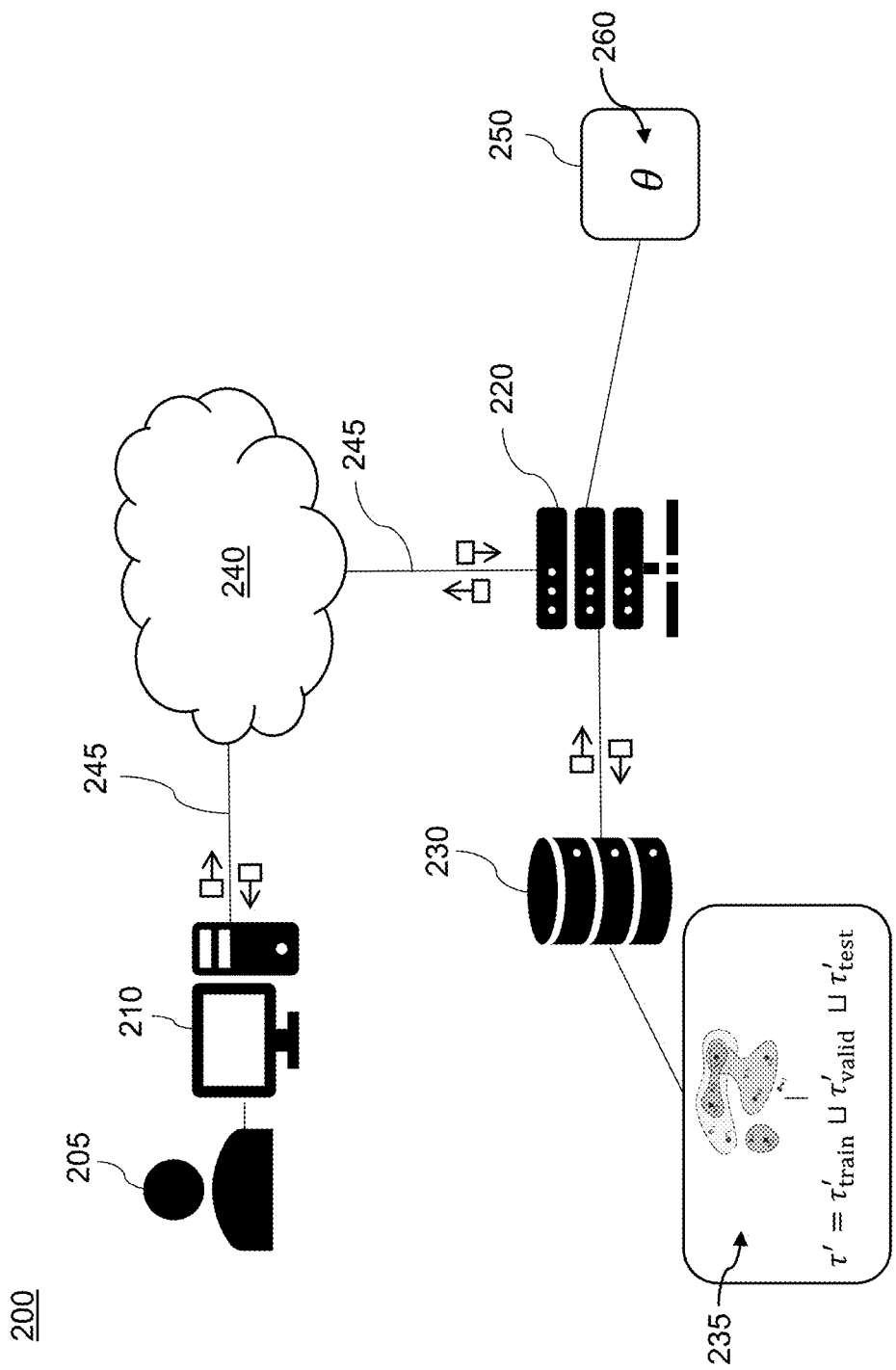
FIG. 2 illustrates a schematic diagram of a communication system in accordance with one or more non-limiting embodiments of the present technology.

Referring to FIG. 2, there is shown a schematic diagram of a system 200, the system 200 being suitable for implementing one or more non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a client device 210 associated with a user 205, a server 220, and a database 230 communicatively coupled over a communications network 240.

Client Device

The system 200 comprises a client device 210. The client device 210 is associated with the user 205. As such, the client device 210 can sometimes be referred to as a "electronic device", "end user device" or "client electronic device". It should be noted that the fact that the client device 210 is associated with the user 205 does not need to suggest or imply any mode of operation—such as a need to log in, a need to be registered, or the like.

The client device 210 comprises one or more components of the electronic device 100 such as one or more single or multi-core processors collectively represented by processor 110, the graphics processing unit (GPU) 111, the solid-state drive 120, the random access memory 130, the display interface 140, and the input/output interface 150.

In one or more embodiments, the user 205 may use the client device 210 to query a question-answering system (not illustrated in FIG. 2) and to receive answers therefrom. The question-answering system may be for example executed by the server 220.

Server

The server 220 is configured to train an embedding model 260 to perform link predictions in a knowledge hypergraph.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a server running an operating system (OS). Needless to say that the server 220 may be implemented in any suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

The implementation of the server 220 is well known to the person skilled in the art. However, the server 220 comprises a communication interface (not shown) configured to communicate with various entities (such as the database 230, for example and other devices potentially coupled to the communication network 240) via the communication network 240. The server 220 further comprises at least one computer processor (e.g., the processor 110 of the electronic device 100) operationally connected with the communication interface and structured and configured to execute various processes to be described herein.

Machine Learning (ML) Models

The set of ML models 250 comprises inter alia a knowledge hypergraph embedding model 260.

The knowledge hypergraph embedding model 260, which will be referred to as the embedding model 260, is an embedding model trained to perform link prediction in knowledge hypergraphs.

It will be appreciated that an embedding is a function from an entity or a relation to a vector or a matrix (or a higher-order tensor) over a field.

During training, the embedding model 260 learns an embedding (i.e. fixed-size vector) for each entity and relation in a training sample or "fact", represented as a relation (entity$_1$, entity$_2$, ..., entity$_n$). The embedding model 260 with parameters θ defines a scoring function φ which generates relation a score for a query tuple.

How the embedding model 260 is trained will be explained in more detail hereinbelow.

During inference, the embedding model 260 is configured to receive as an input a tuple and generate a prediction comprising a score or probability of the tuple being true. The embedding model 260 is a fully expressive, i.e. given any assignment of truth values to all tuples, there exists an assignment of values to the embeddings of the entities and relations that accurately separates the true tuples from the false ones. The embedding model 260 may be used to perform recommendations, question answering and any other link prediction task in a data structure represented as a knowledge hypergraph.

In one or more embodiments, the set of ML models 250 may have been previously initialized, and the server 220 may obtain the set of ML models 250 from the database 230, or from an electronic device connected to the communication network 240.

In one or more other embodiments, the server 220 obtains the set of ML models 250 by performing a model initialization procedure to initialize the model parameters and model hyperparameters of the set of ML models 250. The model parameters are configuration variables of a machine learning model and which are estimated or learned from training data, i.e. the coefficients are chosen during learning based on an optimization strategy for outputting a prediction according to a prediction task.

In one or more embodiments, the server 220 obtains the hyperparameters in addition to the model parameters for the set of ML models 250. The hyperparameters are configuration variables which determine the structure In one or more embodiments, training of the set of ML models 250 is repeated until a termination condition is reached or satisfied. As a non-limiting example, the training may stop upon reaching one or more of: a desired accuracy, a computing budget, a maximum training duration, a lack of improvement in performance, a system failure, and the like.

In one or more embodiments, the server 220 may execute one or more of the set of ML models 250. In one or more alternative embodiments, one or more of the set of ML models 250 may be executed by another server (not illustrated), and the server 220 may access the one or more of the set of ML models 250 for training or for use by connecting to the server (not shown) via an API (not illustrated), and specify parameters of the one or more of the set of ML models 250, transmit data to and/or receive data from the MLA 250, without directly executing the one or more of the set of ML models 250.

As a non-limiting example, one or more ML of the set of ML models 250 may be hosted on a cloud service providing a machine learning API.

Database

A database 230 is communicatively coupled to the server 220 and the client device 210 via the communications network 240 but, in one or more alternative implementations, the database 230 may be directly coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the server 220. The database 230 may receive data from the server 220 for storage thereof and may provide stored data to the server 220 for use thereof.

In the context of the present technology, the database 230 is configured to store inter alia: (i) a knowledge hypergraph 235; (ii) training parameters of the embedding model 260; and (iii) a training dataset, a validation dataset and test dataset obtained from the knowledge hypergraph 235.

The database 230 stores the knowledge hypergraph 235, which is a representation of information in the form of a graph. The knowledge hypergraph 235 represented by $\tau'$ is stored in the form of a plurality of tuples each represented as $r(x_1, \ldots, x_n)$, where $r \in R$ is a relation, $n=|r|$ is the arity of r and each entity $x_i \in \varepsilon$. Thus, a tuple defines a relation r between entities $x_1, \ldots, x_n$.

In one or more embodiments, the database 230 stores at least a portion of the knowledge hypergraph 235 in the form of a training dataset represented by $\tau'_{train}$ (not numbered), a validation dataset represented by $\tau'_{valid}$ (not numbered) and a testing dataset represented by $\tau'_{test}$ (not numbered) such that $\tau' = \tau'_{train} \cup \tau'_{valid} \cup \tau'_{test}$.

As a non-limiting example, the training dataset may be one of: JF17K proposed by Wen et al. [24], FB-AUTO and M-FB15K proposed by Fatemi et al. [9].

In one or more embodiments, the database 230 may store ML file formats, such as .tfrecords, .csv, .npy, and .petastorm as well as the file formats used to store models, such as .pb and .pkl. The database 230 may also store well-known file formats such as, but not limited to image file formats (e.g., .png, .jpeg), video file formats (e.g., .mp4, .mkv, etc), archive file formats (e.g., .zip, .gz, .tar, .bzip2), document file formats (e.g., .docx, .pdf, .txt) or web file formats (e.g., .html).

Communication Network

In one or more embodiments of the present technology, the communications network 240 is the Internet. In one or more alternative non-limiting embodiments, the communication network 240 may be implemented as any suitable local area network (LAN), wide area network (WAN), a private communication network or the like. It will be appreciated that implementations for the communication network 240 are for illustration purposes only. How a communication link 245 (not separately numbered) between the client device 210, the server 220, the database 230, and/or another electronic device (not shown) and the communications network 240 is implemented will depend inter alia on how each electronic device is implemented.

The communication network 240 may be used in order to transmit data packets amongst the client device 210, the server 220 and the database 230. For example, the communication network 240 may be used to transmit requests from the client device 210 to the server 220. In another example, the communication network 240 may be used to transmit a response to the request from the server 220 to the client device 210.

Having explained how the electronic device 100 and the communication system 200 are implemented in accordance with one or more non-limiting embodiments of the present technology, reference will now be made to FIG. 3, which illustrates an example of a knowledge hypergraph 300 split into train and test sets in accordance with one or more non-limiting embodiments of the present technology.

Relational algebra is a formalization that is at the core of relational models (e.g., relational databases). It consists of several primitive operations that can be combined to synthesize all other operations used. Each such operation takes relations as input and returns a relation as output. In a knowledge hypergraph, these operations can describe how relations depend on each other.

Figure 3:
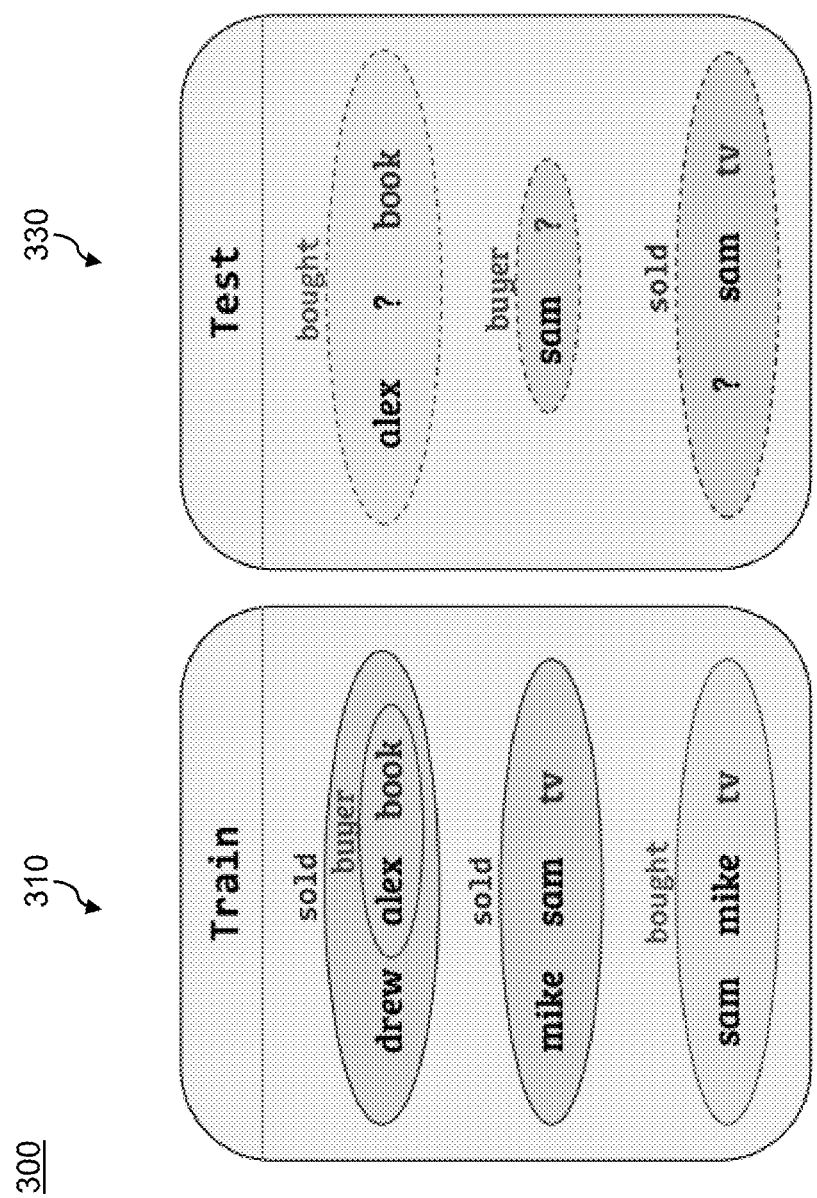
FIG. 3 illustrates a schematic diagram of a training procedure of a graph prediction model in accordance with one or more non-limiting embodiments of the present technology.

To illustrate the connection between relational algebra operations and relations in knowledge hypergraphs, FIG. 3 shows samples from a knowledge hypergraph 300. The train set 310 contains tuples sold(drew, alex, book), buyer(alex, book), sold(mike, sam, tv), and bought(sam, mike, tv). Relation bought can be obtained by applying a renaming operation to relation sold. Similarly, relation buyer is a projection of relation sold. Learning these relational algebra operations may help an embedding model generalize better to the tuples in the test set 320. The test responses, from top to bottom, are drew, tv, and mike.

The relations in the example feature the two primitive relational algebra operations renaming and projection. Relation bought is a renaming of sold. Relation buyer is a projection of relation sold. If a model is able to represent these two operations, it can potentially learn that a tuple bought(X, Y, I) (person X bought from person Y item I) is implied by tuple sold(Y, X, I) (person Y sold to person X item I); or that a tuple buyer(X, I) (person X is the buyer of item I) is implied by the tuple sold(Y, X, I). An embedding model that cannot represent the relational algebra operations renaming and projection would not be able to learn that relation bought is a renaming of relation sold. It would thus be difficult for such a model to reason about the relationship between these two relations.

In contrast, a model that can represent renaming and projection operations is potentially able to determine that bought(alex, drew, book) is true because the train set contains sold(drew, alex, book) and bought is a renaming of sold. One or more embodiments of the present technology aim to provide such an embedding model based on relational algebra.

Knowledge Hypergraph Embedding Model Training Procedure

Figure 4:
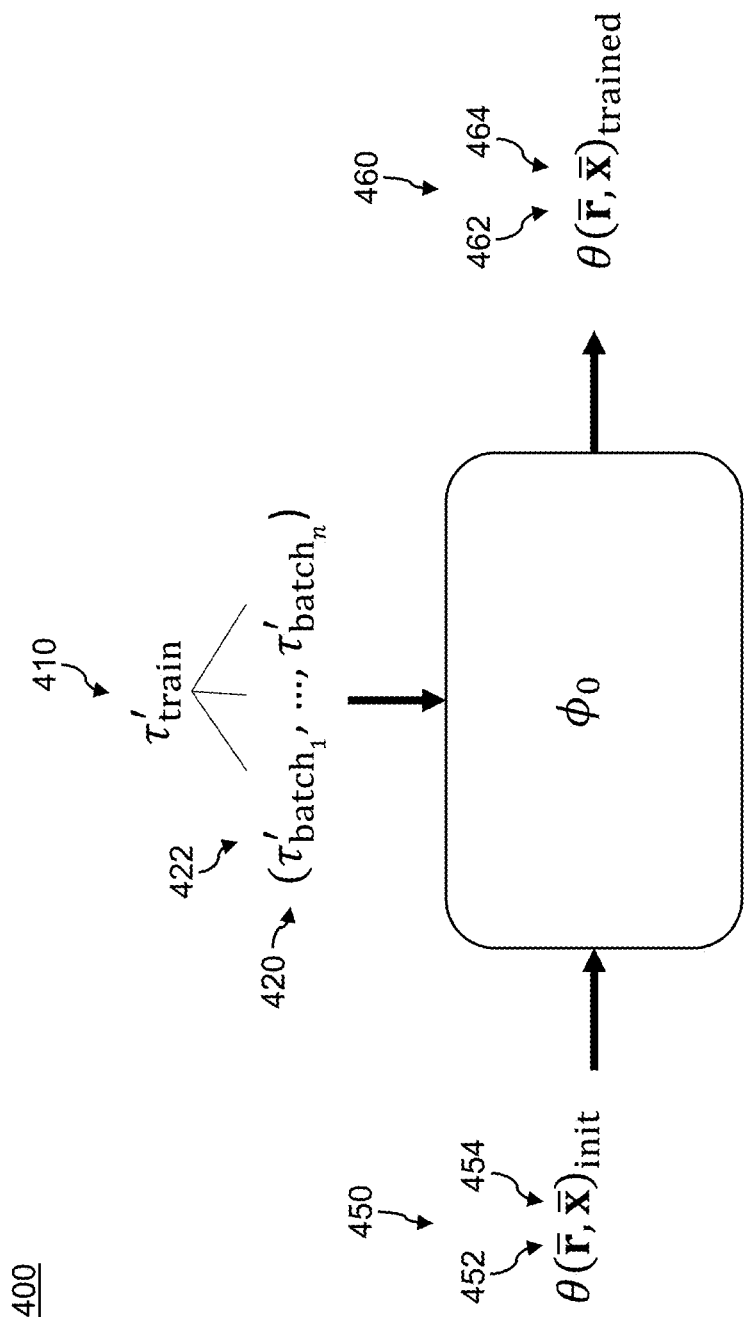
FIG. 4 illustrates a schematic diagram of a knowledge hypergraph link prediction embedding model training procedure in accordance with one or more non-limiting embodiments of the present technology.

With reference to FIG. 4, there is shown a schematic diagram of a knowledge hypergraph (KH) embedding model training procedure 400, which will be referred to as the training procedure 400, the training procedure 400 being illustrated in accordance with one or more non-limiting embodiments of the present technology.

In one or more embodiments of the present technology, the server 220 executes the training procedure 400. In alternative embodiments, the server 220 may execute at least a portion of the training procedure 400, and one or more other servers (not shown) may execute other portions of the training procedure 400.

The embedding model 260 will now be referred to as the embedding model 450 (before training) and the trained embedding model 460 (after training).

The purpose of the training procedure 400 is to train the embedding model 450 to perform link predictions in a knowledge hypergraph 235 by receiving as an input a tuple defining a relation between entities in the knowledge hypergraph 235 and by generating and outputting a relation score indicative of the probability of the tuple being true, i.e. a value quantifying of how true the relation between the entities in the tuple is.

The training procedure 400 is executed such that the embedding model 450 learns to consider interactions between embeddings of entities and relations at different positions by using windows as part of its relation scoring function, where elements within a given window interact with each other.

Thus, it will be appreciated that given a tuple $r(x_1, \ldots, x_n)$, determining whether it is true or false depends on the relation and the entities involved, but also depends on the position of each entity in the tuple, as the role of an entity changes with its position. For example, the role of Polly is significantly different in the two relations bought_from (Polly; Bob) and bought_from(Bob; Polly). Thus, an embedding model to decide whether or not a tuple is true is one that embeds each entity $x_i \in \varepsilon$ into a vector $x_i \in [0, 1]^d$ of length d, and the relation r into a matrix $r \in \mathbb{R}^{|r| \times d}$, where the ith row operates in r over the entity at position i.

The training procedure 400 obtains at least a portion of the knowledge hypergraph 235 $\tau' \subseteq \tau$. In one or more embodiments, the training procedure 400 obtains the portion of the knowledge hypergraph 235 from the database 230.

In one or more embodiments, the training procedure 400 divides the knowledge hypergraph 235 into a training dataset 410 represented by $\tau'_{train}$, a validation dataset (not illustrated) represented by $\tau'_{valid}$ and a testing dataset (not illustrated) represented by $\tau'_{test}$ such that $\tau' = \tau'_{train} \sqcup \tau'_{valid} \sqcup \tau'_{test}$. It will be appreciated that in alternative embodiments, the training procedure 400 may directly acquire each of the training dataset 410, validation dataset and testing dataset obtained from the knowledge graph 235 from the database 230.

The training procedure 400 divides the training dataset 410 into a set of mini-batches 420. It will be appreciated that a given mini-batch 422 is used to compute the gradient of the loss function during a single training iteration, and that each mini-batch in the set of mini-batches 420 is processed to learn optimal values for the embedding model 450.

Each mini-batch 422 of the set of mini-batches 420 comprises a respective set of positive or ground-truth tuples. The set of positive tuples represent facts in the knowledge hypergraph 235. A tuple is represented as $r(x_1, \ldots, x_n)$, where $r \in \varepsilon$, $n=|r|$ is the arity of r and each entity $x_i \in \varepsilon$. The set of positive tuples is represented by $\tau'$, and if a tuple is false (not true), it is not in $\tau'$.

During training of the embedding model 450, the training procedure 400 generates a respective set of negative tuples for each respective set of positive tuples in the mini-batch to train the embedding model 450 on negative examples. In one or more embodiments, the training procedure 400 generates, for each positive tuple in the mini-batch, a negative tuple to obtain the respective set of negative tuples. As a non-limiting example, the training procedure 400 may generate the set of negative tuples by using a function $T_{neg}(t)$.

The training procedure 400 obtains the embedding model 450. In one or more embodiments, the training procedure 400 initializes the embedding model 450 by initializing model parameters and hyperparameters thereof.

The embedding model 450 has a set of model parameters $\theta$. The set of model parameters includes entity embeddings in the form of entity vectors x and relation embeddings in the form of relation matrices R, which will be learned during training.

The embedding model 250 has a scoring function $\phi_\theta$ for mapping tuples to a relation score using its set of model parameters $\theta$.

The training procedure 400 initializes the embedding model 450 by initializing a set of entity vectors 454 and set of relation matrices 452.

The training procedure 400 initializes embedding vectors for each entity in the training dataset 410 to obtain the set of entity vectors 454.

The training procedure 400 initializes the embedding matrix for each relation in the training dataset 410 to obtain the set of relation matrices 452.

In one or more embodiments, the training procedure 400 initializes at least one of the set of entity vectors 454 and set of relation matrices 452 randomly.

The training procedure 400 receives hyperparameters for training the embedding model 450. The hyperparameters include inter alia batch size, number of iterations, learning rates, number of negative examples per positive example for each arity, window size, embedding dimension, and non-linear function to apply on entity vectors before forwarding.

The training procedure 400 uses the scoring function $\phi_\theta$ to determine a score for every fact or positive tuple in the mini-batch based on the respective entity vectors and the relation matrix. The scoring function takes into account the interaction of different elements of the embeddings with each other. In order to create such an interaction, windows are used, whereby elements within the same window interact with each other. It will be appreciated that the windows of an element represent the different portions of the embedding space where that element is embedded. By forcing the windows of different elements to interact with each other, the embedding model 450 learns representations where this space is shared between these elements. This in turn will result in an embedding structure where elements that are "similar" or behave in a similar way, are close to each other in the embedding space (with respect to a given relation). For example, if "Bob is friends with Alice" and "Bob is friends with Carol", it is expected that Alice and Carol are close by in the embedding space with respect to the "friendship" relation.

The embedding model 450 uses windows to increase interaction between embeddings and uses a nonlinear function σ to obtain the contribution of each window, which are then added to give a score. The number of elements in a window is the window size and is a hyperparameter of the embedding model 450.

In one or more embodiments, the embedding model 450 computes the relation score of a tuple $r(x_1, x_2, \ldots, x_n)$, where σ is a monotonically increasing nonlinear function by using equation (1):

$$\phi_\theta(r(x_1, \ldots, x_n)) = \frac{1}{n_w} \sum_{j=0}^{n_w-1} \sigma\left(b_r^j + \sum_{i=1}^{|r|} \sum_{k=0}^{w-1} x_i[jw+k] \times r[i][jw+k]\right) \quad (1)$$

Where w is the window size, $$n = \left[\frac{d}{w}\right]$$

is the number of windows, $b_r^j$ the bias term for relation r for the $j^{th}$ window, for all j=1, 2, . . . , $n_w$, $x_i$ represents the embedding or entity vector of entity $x_i$, r represents the relation matrix, σ represents the monotonically increasing nonlinear function, i represents the entity number, j represents the window number, and k represent an element number within window j.

It will be appreciated that the relation score of equation (1) may be obtained in a plurality of steps by calculating interaction values (e.g. operation between parentheses) and by determining a sum of the interaction values to obtain the relation score.

Figure 5:
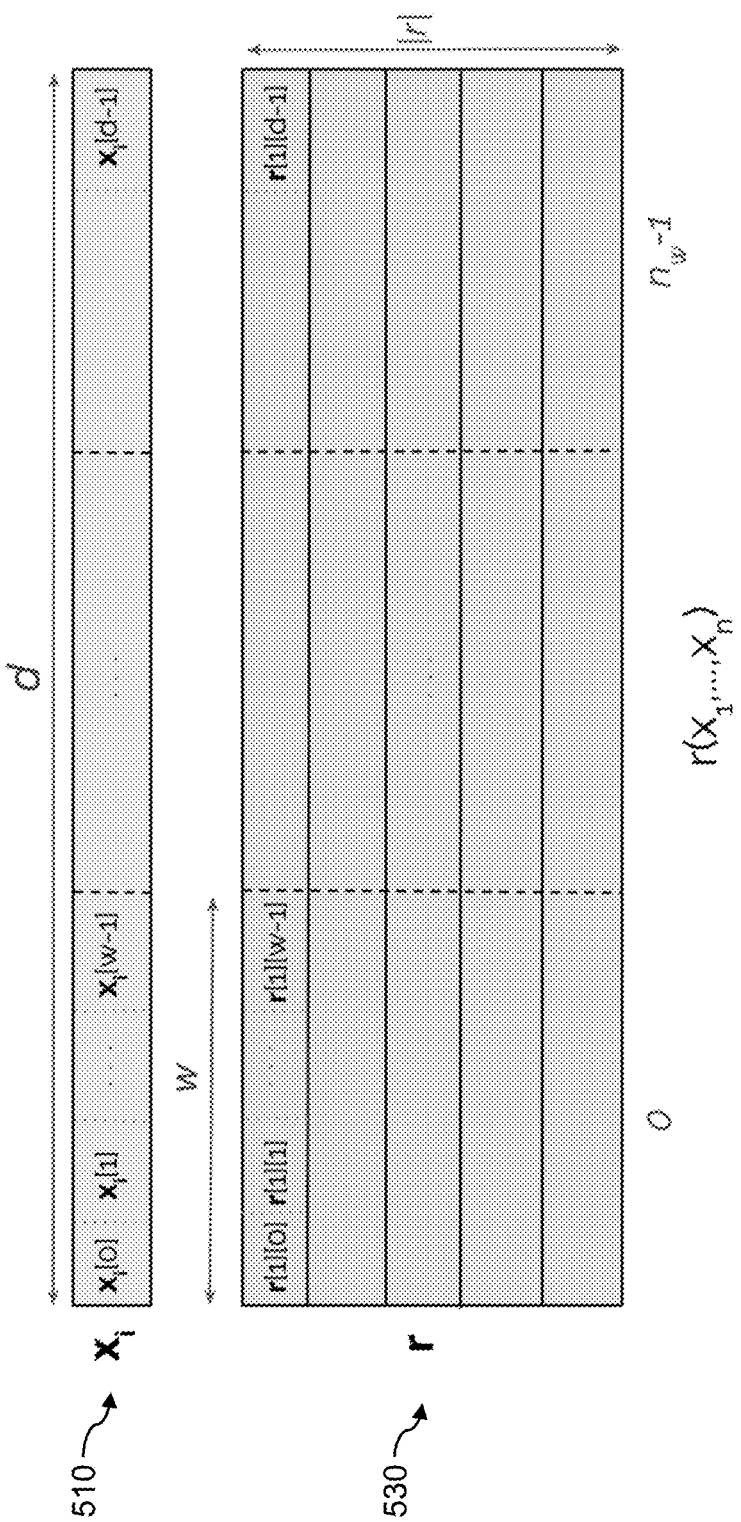
FIG. 5 illustrates a schematic diagram of an entity vector and a relation matrix in accordance with one or more non-limiting embodiments of the present technology.

With brief reference to FIG. 5, there is illustrated a schematic diagram of an entity vector 510 and a relation matrix 530 in accordance with one or more non-limiting embodiments of the present technology.

The entity vector 510 has length d and is divided into $n_w$ windows each of size w. It can be seen that there are w elements within a window in the entity vector 510.

The relation matrix 530 has dimensions |r|×d where the $i^{th}$ row operates over the entity at position i. The relation matrix 530 is divided into $n_w$ windows each of size w. It can be seen that there are w elements within a window in the relation matrix 530.

Referring back to FIG. 4, the training procedure 400 determines a respective relation score for each tuple in the mini-batch 422 by using equation (1).

The training procedure 400 uses a loss function to calculate a loss $L(\theta, \tau'_{batch})$ based on the relation scores generated by the embedding model 450 for the mini-batch.

In one or more embodiments, the training procedure 400 a cross entropy loss, which is a combination of SoftMax and negative log likelihood loss, and has been shown to be effective for link prediction.

In one or more embodiments, a cross-entropy loss is determined using a cross-entropy loss function defined by using equation (2):

$$\mathcal{L}(\theta, \tau'_{batch}) = \sum_{t \in \tau'_{batch}} -\log\left(\frac{e^{\phi_\theta(t)}}{\sum_{t' \in \{t\} \cup T_{neg}(t)} e^{\phi_\theta(t')}}\right) \quad (2)$$

Where θ represents parameters of the model including relation and entity embeddings, and $\varphi_\theta$ is the function given by equation (1) that maps a tuple to a score using parameters θ and $\tau'_{batch}$ is a batch of tuples in $\tau'_{train}$.

The training procedure 400 uses stochastic gradient descent to update values of the entity vectors 454 and relation matrices 452. The training procedure 400 computes the gradient of the loss with respect to the entity vectors and the relation matrices, and uses backpropagation to update values of at least one of the relation matrices 452 and the entity vectors 454 based on the gradient values to obtain updated values.

The training procedure 400 then repeats the process for each batch 422 in the training dataset 410.

In one or more embodiments, the training procedure 400 stops upon reaching or satisfying a termination condition. As a non-limiting example, the training may stop upon reaching one or more of: a desired accuracy, a computing budget, a maximum training duration, a lack of improvement in performance, a system failure, and the like.

The training procedure 400 outputs a trained embedding model 460. The trained embedding model 460 comprises a set of learned entity vectors 464 comprising updated values and a set of learned relation matrices 462 comprising updated values learned during training.

The trained embedding model 460 may then be used to perform link predictions in the knowledge hypergraph 235 by receiving as an input a tuple comprising a relation between entities and by outputting a relation score indicative of a probability of the relation or tuple being true. The trained embedding model 460 is adapted to represent a set of relational algebra operations comprising at least one of: renaming, projection, set union, selection, and set difference.

In one or more embodiments, the training procedure 400 may be implemented by using the following pseudocode:

PSEUDOCODE 1

Initialize (randomly) the embedding vectors for every entity in the KG
Initialize (randomly) the embedding matrix for every relation in the KG
For every epoch:

-continued

PSEUDOCODE 1

```
Repeat
    Pick a batch of facts from the KG
        Generate negative samples and add it to the batch
        Compute a score for every fact in the batch using Eq. (1)
        based on the current entity/relation embedding values
        Compute the loss using the scores
        Compute the gradient with respect to the embedding using
    stochastic gradient descent
    Backpropagate through the embedding of entities and relations
    (update the vector/matrix values of the embeddings based on
    the gradient values)
Until last batch (all KG facts are processed)
```

In one or more other embodiments, the training procedure 400 may be implemented by using the following pseudocode:

PSEUDOCODE 2

```
Input: Tuples τ'_train, loss function L, scoring function φ_θ
Output: Embeddings x and r for all entities and relations in τ'_train
Initialize x and r (at random)
for every batch τ'_batch of tuples in τ'_train do
    for tuple t in τ'_batch do
        Generate negative tuples T_neg(t)
        for t' ∈ {t} ∪ T_neg(t) do
            Compute φ_θ(t')
        end for
    end for
    Compute the loss L (θ,τ'_batch)
    Compute the gradient of loss with respect to x and r
    Update embeddings x and r through-back-propagation
end for
```

Figure 6:
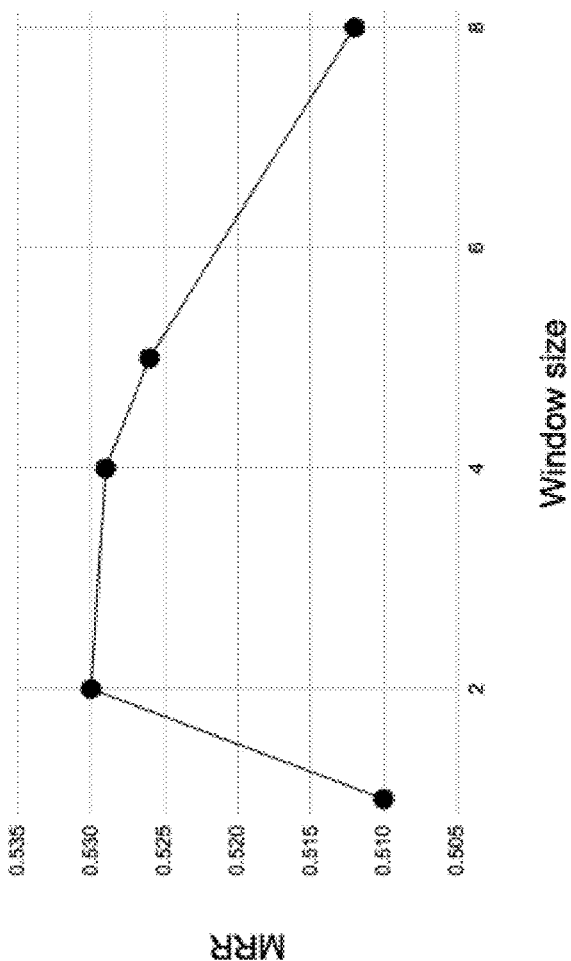
FIG. 6 illustrates an example plot of mean reciprocal rank (MRR) for different window sizes obtained by an implementation of the present technology on the JF17K dataset.

FIG. 6 illustrates a plot of mean reciprocal rank (MRR) for different window sizes obtained by an implementation of the present technology on the JF17K dataset.

A theoretical analysis and additional information related to the present technology is described in "Knowledge Hypergraph Embedding Meets Relational Algebra." (2021) by Fatemi, Bahare et al. accessible on the arXiv preprint server (abs/2102.09557).

Question-Answering System

Figure 7:
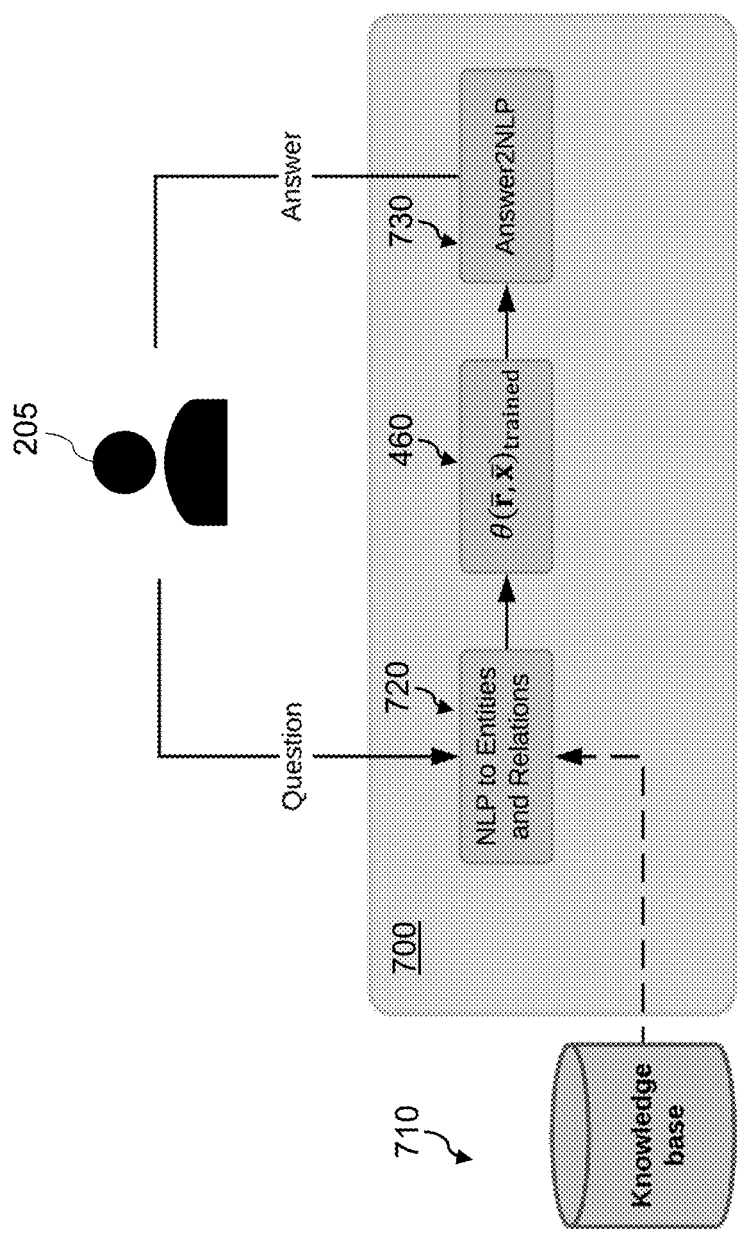
FIG. 7 illustrates a schematic diagram of the embedding model implemented as part of a question-answering (Q-A) system in accordance with one or more non-limiting embodiments of the present technology.

FIG. 7 illustrates a schematic diagram of the trained embedding model 460 implemented as part of a question-answering (Q-A) system 700 in accordance with one or more non-limiting embodiments of the present technology.

The Q-A system 700 can answer questions provided by the user 205 expressed in natural language by retrieving information from a knowledge base 710. The knowledge base 710 may be implemented as a SQL database. In one or more embodiments, the knowledge base 710 may be stored in the database 230.

The Q-A system 700 uses a first natural language processing model 720 to convert natural language sequences into queries comprising entities and relations between entities.

When the answer to the question exists in the knowledge base 710, the Q-A system 700 can give the correct answer. When the needed information does not exist in the knowledge base 710, the Q-A system 700, without the trained embedding model 460 is not able to infer or reason from other facts in the knowledge base 710.

The trained embedding model 460 extends the Q-A system 700 by adding the capability to perform basic reasoning on the knowledge base 710 (in the form of knowledge hypergraphs) to answer questions that can not be directly answered with the existing knowledge in the knowledge base 710.

The trained embedding model 460 provides an answer to the question with an associated relation score or probability that indicates the degree of uncertainty of the answer. The Q-A system 700 converts the answer from the trained embedding model 460 by using a second natural language processing model 730.

Method Description

Figure 8:
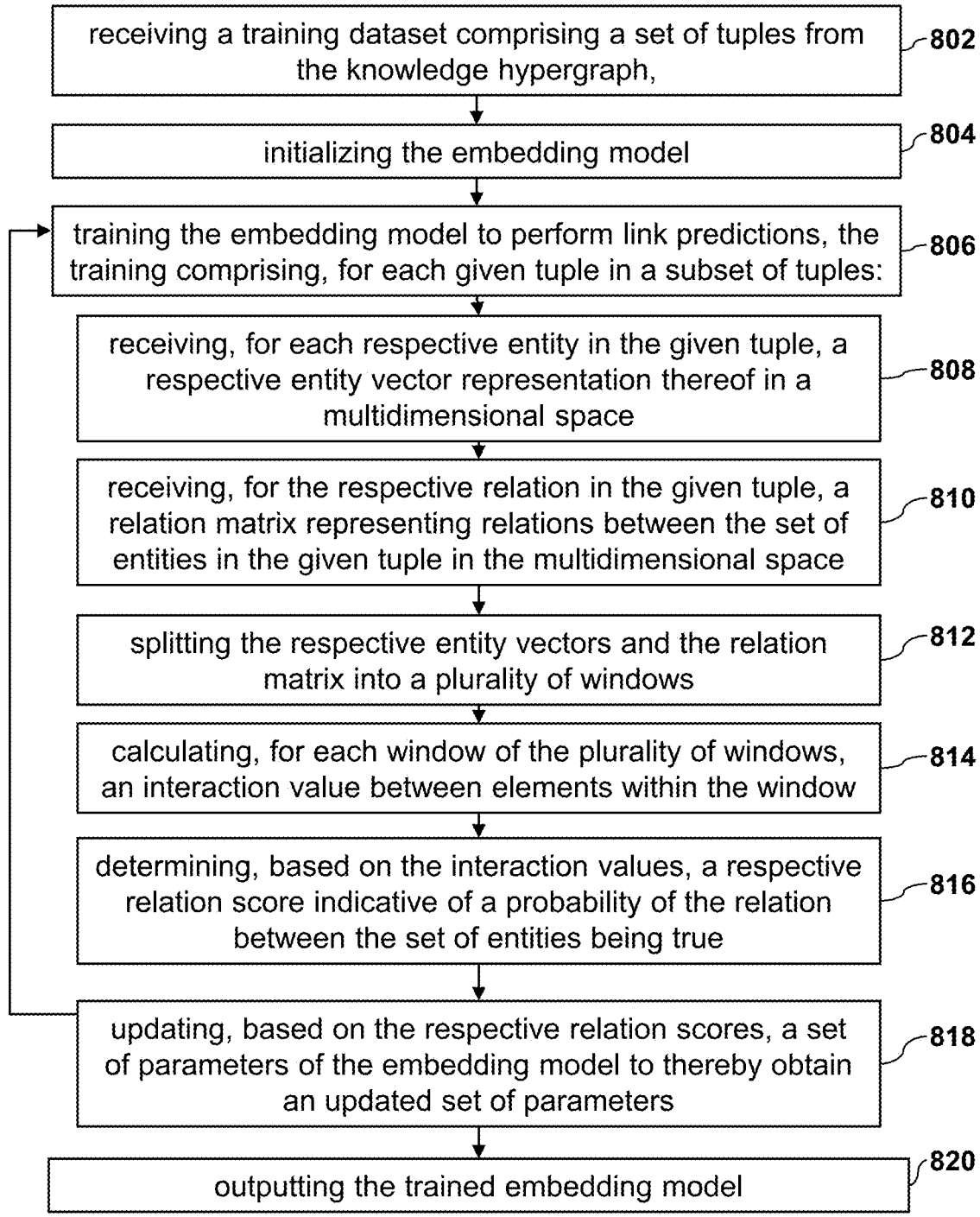
FIG. 8 illustrates a flow chart of a method for training an embedding model to perform link prediction in a knowledge hypergraph, the method being executed in accordance with one or more non-limiting embodiments of the present technology.

FIG. 8 illustrates a flowchart of a method 800 for training an embedding model to perform link prediction in a knowledge hypergraph in accordance with one or more non-limiting embodiments of the present technology.

In one or more embodiments, the server 220 comprises a processing device such as the processor 110 and/or the GPU 111 operatively connected to a non-transitory computer readable storage medium such as the solid-state drive 120 and/or the random-access memory 130 storing computer-readable instructions. The processing device, upon executing the computer-readable instructions, is configured to or operable to execute the method 800.

The method 800 begins at processing step 802.

According to processing step 802, the processing device receives a training dataset 410 comprising a set of tuples from the knowledge hypergraph 235, each of the set of tuples comprising a respective relation between a respective set of entities in the knowledge hypergraph 235. In one or more embodiments, the training procedure 400 divides the training dataset 410 into a set of mini-batches 420.

According to processing step 804, the processing device initializes the embedding model 450 by initializing a set of entity vectors 454 and set of relation matrices 452. The processing device generates entity vectors for each entity in the training dataset 410 and generates an entity matrix for every relation in the training dataset 410. In one or more embodiments, the processing devices initializes the entity vectors 454 and the relation matrices 452 randomly.

In one or more embodiments, the training dataset 410 comprises a set of positive tuples from knowledge graph 235, and a set of negative tuples having been generated based on the set of positive tuples from the knowledge graph 235. In one or more embodiments, the processing device may receive the set of positive tuples from the knowledge graph 235 and generate a set of negative tuples.

According to processing step 806, the processing device trains the embedding model 450 to perform relation or link predictions in the knowledge graph 235 based on the training dataset 410. The training comprises processing steps 808-818 executed on each mini-batch 422 of the set of mini-batches 420 of the training dataset 410.

According to processing step 808, the processing device receives, for each entity in a given tuple in a mini-batch 422, a respective entity vector representation thereof in a multi-dimensional or embedding space.

According to processing step 808, the processing device receives, for a given tuple in a mini-batch 422, a relation matrix representing relations between the set of entities in the given tuple in the multidimensional space.

According to processing step 812, the processing device splits the respective entity vectors and the relation matrix into a plurality of windows. It will be appreciated that the splitting may be performed by iterating over the elements according to a window size.

According to processing step 814, the processing device calculates, for each window of the plurality of windows, an interaction value indicative of an interaction between elements of the respective entity vectors and the relation matrix within the window. It will be appreciated that the calculation of the interaction value may be performed by iterating over the entity vectors and elements.

According to processing step 816, the processing device determines, based on the interaction values, a respective relation score for the given tuple, the relation score being indicative of a probability of the relation between the set of entities in the given tuple being true.

According to processing step 818, the processing device updates, based on the respective relation scores, a set of parameters of the embedding model to thereby obtain an updated set of parameters. The processing device uses stochastic gradient descent to update values of the entity vectors 454 and relation matrices 452. The processing device computes the gradient of the loss with respect to the entity vectors and the relation matrices, and uses backpropagation to update values of at least one of the relation matrices 452 and the entity vectors 454 based on the gradient values to obtain updated values.

Processing steps 808-818 are repeated for each mini-batch 422 of the set of mini-batches 420.

According to processing step 820, the processing device outputs a trained embedding model 460 comprising a set of updated parameters. The set of updated parameters comprises a set of learned entity vectors 464 comprising updated values and a set of learned relation matrices 462 comprising updated values learned during training.

The method 800 then ends.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for training an embedding model to perform relation predictions in a knowledge hypergraph to output a trained embedding model, the method being executed by a processor, the method comprising:
   receiving a training dataset comprising a set of tuples from the knowledge hypergraph, each of the set of tuples comprising a respective relation between a respective set of entities in the knowledge hypergraph;
   initializing the embedding model;
   training the embedding model to perform relation predictions between entities in the training dataset to thereby obtain a trained embedding model, the training comprising:
   for each given tuple in a subset of tuples from the training dataset:
   generating, for each respective entity in the given tuple, a respective entity vector representation thereof in a multidimensional space;
   generating, for the respective relation in the given tuple, a relation matrix representing relations between the set of entities in the given tuple in the multidimensional space;
   splitting the respective entity vectors and the relation matrix into a plurality of windows;
   calculating, for each window of the plurality of windows, an interaction value indicative of an interaction between elements of the respective entity vectors and the relation matrix within the window;
   determining, based on the interaction values, a respective relation score for the given tuple, the relation score being indicative of a probability of the relation between the set of entities being true; and
   updating, based on the respective relation scores, at least a set of parameters of the embedding model to thereby obtain an updated set of parameters; and
   outputting the trained embedding model, the trained embedding model comprising the set updated set of parameters.

2. The method of claim 1, further comprising, prior to said updating based on the respective relation scores, the set of parameters of the embedding model to thereby obtain an updated set of parameters:
   determining, using a loss function, based on the relation scores and the subset of tuples, a loss; and wherein
   said updating comprises backpropagating, based on the loss, values of the set of parameters to thereby obtain the updated set of parameters.

3. The method of claim 2, wherein the loss function comprises a cross entropy loss.

4. The method of claim 3, wherein said updating comprises using stochastic gradient descent.

5. The method of claim 1, wherein each window comprises a predetermined number of elements.

6. The method of claim 5, wherein a number the plurality of windows is a ratio of a number of dimensions in the multidimensional space and the predetermined number of elements.

7. The method of claim 1, wherein said determining the respective relation score for the given tuple comprises using a monotonically increasing nonlinear function.

8. The method of claim 7, wherein said determining the respective relation score comprises using a scoring function defined by:

$$\phi_\theta(r(x_1, \ldots, x_n)) = \frac{1}{n_w} \sum_{j=0}^{n_w-1} \sigma\left(b_r^j + \sum_{i=1}^{|r|} \sum_{k=0}^{w-1} x_i[jw+k] \times r[i][jw+k]\right)$$

where:
$x_i$ is the entity vector of an entity $x_i$,
r is a relation matrix of a tuple $r(x_1, \ldots, x_n)$,
$\sigma$ is the monotonically increasing nonlinear function,
i is an entity number,
j is a window number from 0 to $n_w$, $$n = \left\lceil \frac{d}{w} \right\rceil$$

the number of windows, and $b_r^j$ the bias term for relation r for the $j^{th}$ window, for all j=1, 2, ..., $n_w$, and k is an element number within window j.

9. The method of claim 1, wherein the trained embedding model is adapted to represent a set of relational algebra operations comprising at least one of: renaming, projection, set union, selection, and set difference.

10. The method of claim 1, wherein each set of entities in a tuple comprises at least two entities.

11. The method of claim 1, wherein the set of tuples comprises positive tuples representing facts in the knowledge hypergraph and negative tuples representing lies in the knowledge hypergraph.

12. A system for training an embedding model to perform relation predictions in a knowledge hypergraph to output a trained embedding model, the system comprising:
a processor; and
a non-transitory storage medium operatively connected to the processor, the non-transitory storage medium comprising computer-readable instructions,
the processor, upon executing the computer-readable instructions, being configured for:
receiving a training dataset comprising a set of tuples from the knowledge hypergraph, each of the set of tuples comprising a respective relation between a respective set of entities in the knowledge hypergraph;
initializing the embedding model;
training the embedding model to perform relation predictions between entities in the training dataset to thereby obtain a trained embedding model, the training comprising:
for each given tuple in a subset of tuples from the training dataset:
generating, for each respective entity in the given tuple, a respective entity vector representation thereof in a multidimensional space;
generating, for the respective relation in the given tuple, a relation matrix representing relations between the set of entities in the given tuple in the multidimensional space;
splitting the respective entity vectors and the relation matrix into a plurality of windows;
calculating, for each window of the plurality of windows, an interaction value indicative of an interaction between elements of the respective entity vectors and the relation matrix within the window;
determining, based on the interaction values, a respective relation score for the given tuple, the relation score being indicative of a probability of the relation between the set of entities being true; and
updating, based on the respective relation scores, at least a set of parameters of the embedding model to thereby obtain an updated set of parameters; and
outputting the trained embedding model, the trained embedding model comprising the set updated set of parameters.

13. The system of claim 12, wherein the processor is further configured for, prior to said updating based on the respective relation scores, the set of parameters of the embedding model to thereby obtain an updated set of parameters:
determining, using a loss function, based on the relation scores and the subset of tuples, a loss; and wherein
said updating comprises backpropagating, based on the loss, values of the set of parameters to thereby obtain the updated set of parameters.

14. The system of claim 13, wherein the loss function comprises a cross entropy loss.

15. The system of claim 14, wherein said updating comprises using stochastic gradient descent.

16. The system of claim 12, wherein each window comprises a predetermined number of elements.

17. The system of claim 16, wherein a number the plurality of windows is a ratio of a number of dimensions in the multidimensional space and the predetermined number of elements.

18. The system of claim 12, wherein said determining the respective relation score for the given tuple comprises using a monotonically increasing nonlinear function.

19. The system of claim 18, wherein said determining the respective relation score comprises using a scoring function defined by:

$$\phi_\theta(r(x_1, \ldots, x_n)) = \frac{1}{n_w} \sum_{j=0}^{n_w-1} \sigma\left(b_r^j + \sum_{i=1}^{|r|} \sum_{k=0}^{w-1} x_i[jw+k] \times r[i][jw+k]\right)$$

where:

$x_i$ is the entity vector of an entity $x_i$, r is a relation matrix of a tuple $r(x_1, \ldots, x_n)$, $\sigma$ is the monotonically increasing nonlinear function, i is an entity number, j is a window number from 0 to $n_w$, $$n = \left[\frac{d}{w}\right]$$

the number of windows, and $b_r^j$ the bias term for relation r for the $j^{th}$ window, for all j=1, 2, ..., $n_w$, and k is an element number within window j.

20. The system of claim 12, wherein the trained embedding model is adapted to represent a set of relational algebra operations comprising at least one of: renaming, projection, set union, selection, and set difference.

21. The system of claim 12, wherein each set of entities in a tuple comprises at least two entities.

22. The system of claim 12, wherein the set of tuples comprises positive tuples representing facts in the knowledge hypergraph and negative tuples representing lies in the knowledge hypergraph.

* * * * *